Nov. 18, 1947.  G. M. RASSWEILER ET AL  2,431,234

AUTOMATIC SONIC MEASURING MEANS

Filed Dec. 4, 1944

Inventors
Gerald M. Rassweiler
& Wesley S. Erwin

Attorneys

Patented Nov. 18, 1947

2,431,234

UNITED STATES PATENT OFFICE 2,431,234

AUTOMATIC SONIC MEASURING MEANS

Gerald M. Rassweiler, Ferndale, and Wesley S. Erwin, Detroit, Mich., assignors to General Motors Corporation, Detroit, Mich., a corporation of Delaware Application December 4, 1944, Serial No. 566,608

8 Claims. (Cl. 73—67)

1

This invention relates to measuring, gaging, sorting, or structural study means and more specifically to such a means as utilizes a crystal mechanically coupled to a part being investigated as shown and described in a co-pending application for U. S. Letters Patent, Serial No. 532,199, filed April 21, 1944, in the same of Wesley S. Erwin and assigned to a common assignee. That application fully describes a means for oscillating or vibrating an electro-mechanical transducer such, for example, as a piezoelectric quartz crystal, the latter being mechanically coupled to or loaded with a part which is being investigated. The loading of the crystal is greater at resonant frequencies of the part, the resonant frequencies being determined by dimensions and properties of the part. The pronounced indication in the output circuit of the oscillator due to resonant loading thus provides a means of measuring dimensions or properties. The tuning of the oscillator over a band to be investigated would include a frequency inversely proportional, for example, to the dimension being measured and the tuning was in the prior application manually accomplished by the operator and when the indicating meter of the device made a sharp peaked movement, this informed the operator that at that frequency the power load was materially increased due to the resonance of the part which was an inverse measure of the dimension such as thickness. Manually tuning the band was, however, a rather arduous task and in some instances absorbed more time than was considered necessary. In order to locate this narrow peaked point a rapid automatic scanning of the band and viewing means thereof was believed necessary.

It is an object of our invention to provide a scanning and viewing means for measuring or gaging means utilizing high frequency transducer loading.

It is a still further object of our invention to provide a repetitive scanning means for the frequency band utilized in the measuring means of a speed in excess of the retentivity of vision so that the signal impressed by the pickup will appear to be stationary.

With these and other objects in view which will become apparent as the specification proceeds, our invention will be best understood by reference to the following specification and claims and the illustrations in the accompanying drawings, in which:

2

Figure 1:
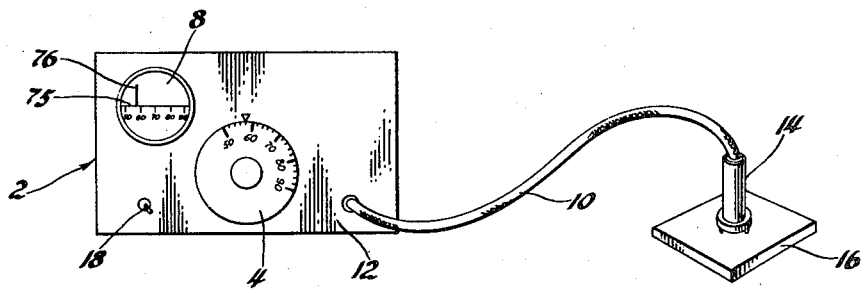
Figure 1 is a perspective view showing in general the apparatus of our invention.

Referring now more specifically to the drawings, there is shown in Figure 1 the measuring or gaging device indicated generally at 2 which is controlled by a tuning adjuster 4. The indications of output are indicated upon the head 8 of a cathode ray tube. A connecting cable 10 is provided between the oscillator which is housed in casing 12 and the applicator 14 which is applied to the surface of a part 16 which is being measured or tested.

The operation of such a gaging means is that the operator grasps the applicator 14 which houses a crystal and applies the same to the surface of the part to be gaged, the oscillator is then energized through operation of a switch such as 18 and the same is tuned over a band of frequencies by a motor 56. As the frequency impressed by the crystal upon the part varies, a certain frequency will be reached which causes the part to resonate and this frequency will be such that the thickness of the part is in inverse proportion to the frequency being impressed. At this resonant point the mechanical power loading upon the crystal materially increases and a sharp indication or upward deflection of the spot on the cathode ray tube screen 8 will result notifying the operator that this is the resonance point. The oscillograph screen can be directly calibrated in thickness.

Figure 2:
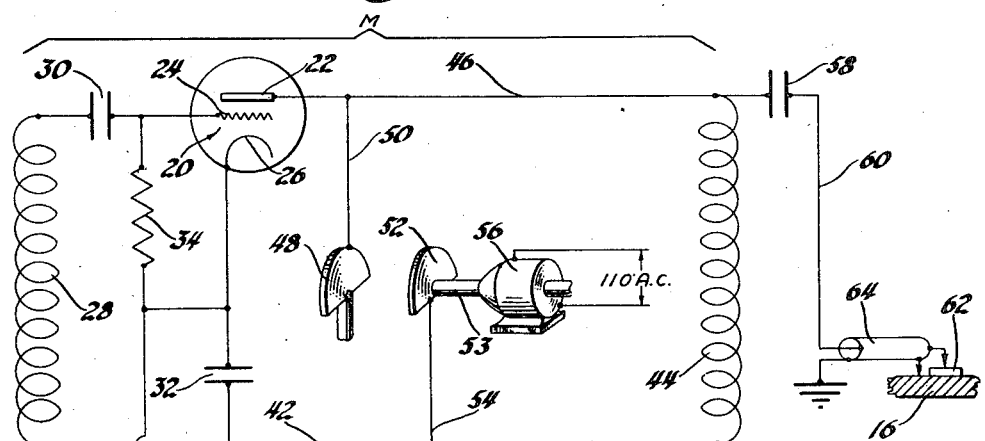
Figure 2 is a schematic wiring diagram of the system incorporated in our invention.

Referring now more specifically to Figure 2, there is shown therein an oscillator tube 20 comprising a plate 22, a control grid 24 and a cathode 26. An inductance 28 connected in series with a capacity 30 are connected across the grid and cathode and a second capacity 32 is connected in the cathode lead. A grid leak resistor 34 is connected to the grid and to the cathode 26 and the cathode is connected through conductor 36 to a ground and — (negative of plate voltage supply). A bleeder resistor 38 is also grounded. This resistor 38 is connected to + (positive of plate voltage supply). Conductive line 42 connects one end of the inductor 28 and a second output inductor 44. These inductors have mutual inductance to provide grid feedback. The opposite end of the inductor or coil 44 is connected to the plate 22 of the tube 20 through conductor 46.

Connected in parallel across the inductor 44 is a variable condenser comprising one or more stationary plates 48 connected to line 46 through line 50 and a movable or rotary plate or plates 52 connected through line 54 with line 42. In this instance the movable plate 52 is driven by a small scanning motor 56 driven from a suitable source of current. A 60 cycle synchronous motor here has the advantage of easy oscilloscope sweep synchronization. The output circuit of the oscillator is capacitatively coupled to the applicator through condenser 58 and line 60 housed in cable 10. This latter line is connected to crystal 62 which is directly in contact with the part 16, the shield 64 for the same being grounded.

A resistor 66 which is placed in the plate lead provides voltage indication of plate current and is connected through condenser 71 to the input terminals 68 and 70 of the amplifier 72 whose output is connected to the vertical deflecting plates of an oscilloscope 73. The horizontal sweep generator 74 is connected to the horizontal deflecting plates of the oscilloscope. The sweep timing is synchronized with the 60 cycle line frequency when a synchronous motor drive is used. For any motor a contactor on the shaft may be used to provide synchronization.

Figure 3:
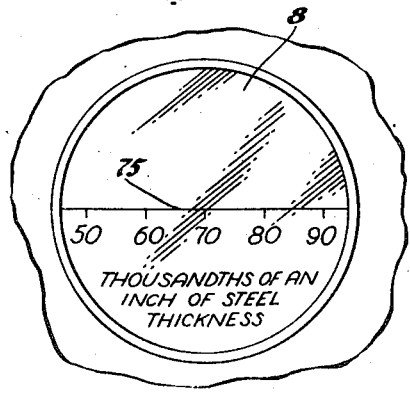
Figure 3 is an enlarged front plan view of the indicator head.

The fluorescent screen of this oscilloscope tube is shown at 8. This is also shown in an enlarged figure at 3 in which the horizontal scale 75 is more clearly shown. This horizontal scale may be, of course, calibrated for any particular thickness or dimension which it is desired to measure but in this instance is illustratively shown as being between 50 and 90 thousandths of an inch of steel. Thus, with the device operating, the sweep circuit of the oscilloscope will provide a horizontal trace which may be calibrated as shown in Figure 3 and with the motor 56 energized, the oscillator will be tuned over an equivalent frequency band. However, since there is no resonant loading the trace will merely appear as a flat horizontal line.

If now the applicator is applied to a part to be tested, once per half revolution of the motor 56, resonant points or peaks will be obtained if the dimension of the part is within the frequency range. The increase in oscillator loading at the frequency of one of these resonance points will develop a voltage across the resistance 66 at that frequency and thus provide a vertical indication as shown at 76 on the cathode ray tube 8 of Figure 1. Since this reoccurs at high speed this indication will merely remain stationary and a direct and accurate reading may be obtained substantially instantaneously. If, of course, the part being examined is 80 thousandths of an inch thick then the vertical indication would appear at that point on the scale and we thus quickly and readily indicate the accurate thickness of the part.

Figure 4:
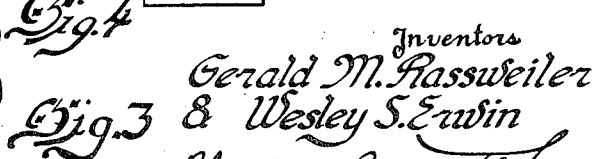
Figure 4 is a schematic diagram of a modified form of our invention.

It is desired to clearly point out that the specific device just described is merely illustrative of various specific parts that may be used to accomplish applicants' invention and that our invention should not be limited to this specific showing. Other methods of indicating the frequencies at which resonance of the part being examined occurs, are also practicable. One such method is shown in Figure 4 wherein the circuit is the same as Figure 2 except that the cathode ray oscillograph is omitted and the amplifier which was used for its vertical deflecting plates is now used to fire a stroboscopic light source each time that resonance of the part occurs. This stroboscopic light 80 is then focused on a calibrated disc 82 on the tuning condenser-motor shaft. This causes the disc to apparently stand still in the angular position at which the condenser tunes to the resonant frequency of the part being tested. The stroboscopic readings can then be made on the disc calibrations opposite a fixed pointer.

It is also obvious that while this device has been described as accomplishing the measurement of a dimension, that its uses are widely varied and that it can be used for measuring other properties such as modulus, density, composition, soundness or freedom from flaws.

We claim:

1. In measuring means, a variable frequency electrical generator, means for continuously cyclically tuning said generator over a predetermined frequency range, electro-mechanical transducer means transmitting vibrations by contact to a part to be examined and connected to said generator output, and means for instantaneously repetitively indicating the generator output as a function of frequency.

2. In measuring means, a continuously oscillating tunable electrical circuit, means for continuously cyclically tuning said circuit over a predetermined range, electro-mechanical transducer means to transmit vibrations by contact to a part to be examined and connected to said oscillator circuit output, an oscilloscope having vertical and horizontal deflection means, means for connecting said vertical deflection means to indicate said oscillator output and means for synchronizing the horizontal deflection means with the means for tuning said oscillator.

3. In measuring means, a tunable electrical oscillator, means for continuously cyclically tuning said oscillator over a predetermined range, electro-mechanical transducer means to transmit vibrations by contact to a part to be examined connected to said oscillator output, and stroboscopic means focused upon the means for cyclically tuning the oscillator and actuated by indications of changes in oscillator output.

4. In measuring means, a tunable electrical oscillator, motor driven means for cyclically tuning the same over its range, electro-mechanical transducer means to transmit vibrations by contact to a part to be measured connected to the oscillator output, and oscilloscope means synchronized with the motor driven means and connected to indicate the oscillator output to provide visual indication of resonance points.

5. In measuring means, a tunable electrical oscillator, motor driven means for continuously cyclically tuning the same over its range, a piezoelectric crystal mounted in juxtaposition to a part to be examined connected to the output of said oscillator so that it mechanically impresses vibrations upon the part to set the part into motion, an oscilloscope having horizontal and vertical deflection plates, the horizontal plates being synchronized with the motor driven tuning means and means for connecting indications of the output of the oscillator to the vertical deflection plates so that a change in the oscillator load as occasioned by resonance of the part being examined may be visually indicated on the oscilloscope.

6. In measuring means, an electrical oscillator including an electron tube, means in the plate circuit of said oscillator for tuning the same over a predetermined range, means for moving the tunable element of the tunable means continuously to scan the frequency range of the oscillator, a piezoelectric crystal connected to the oscillator and mounted in juxtaposition to a part to be examined capable of impressing mechanical vibrations upon said part, the part acting as a load upon said crystal, so that at resonance of said part a change in crystal load will result effecting a change in oscillator output and oscilloscope means connected to the oscillator output to indicate same and the resonant position in the tuning range.

7. In measuring means, an electrical oscillator including an electron tube, means in the plate circuit of said oscillator for tuning the same over a predetermined range, means for moving the tunable element of the tunable means continuously to scan the frequency range of the oscillator, a piezoelectric crystal connected to the oscillator and mounted in juxtaposition to a part to be examined capable of impressing mechanical vibrations upon said part, the part acting as a load upon said transducer, so that at resonance of said part a change in crystal load will result effecting a change in oscillator output, stroboscopic means focused upon the means for moving the tunable element over a range, and connected to and actuated by said changes in crystal load.

3. In measuring means, a tunable electrical oscillator, means for continuously cyclically tuning said oscillator over a predetermined range, electro-mechanical transducer means to transmit vibrations by contact to a part to be examined connected to said oscillator output, a cathode ray oscilloscope having vertical and horizontal deflection plates, means for synchronizing the energization of the horizontal plates with the motion of the tuning means, means for connecting said vertical deflection plates to indicate said oscillator output so that a change in the oscillator load as occasioned by resonance of the part being examined may be visually indicated on the oscilloscope as a stationary pattern.

GERALD M. RASSWEILER.
WESLEY S. ERWIN.

REFERENCES CITED

The following references are of record in the file of this patent:

UNITED STATES PATENTS

| Number | Name | Date |
| --- | --- | --- |
| 1,414,077 | Fessenden | Apr. 25, 1922 |
| 1,990,085 | Mudge et al. | Feb. 5, 1935 |
| 2,105,479 | Hayes | Jan. 18, 1938 |
| 2,178,252 | Forster | Oct. 31, 1939 |
| 2,277,037 | Clark et al. | Mar. 24, 1942 |
| 2,280,226 | Firestone | Apr. 21, 1942 |

FOREIGN PATENTS

| Number | Country | Date |
| --- | --- | --- |
| 521,066 | Germany | Mar. 16, 1931 |